W. ROBERTS.
BAKING OVEN.
APPLICATION FILED JAN. 4, 1919.

1,394,220.

Patented Oct. 18, 1921.
3 SHEETS—SHEET 1.

INVENTOR
W. Roberts
BY
ATTYS

W. ROBERTS.
BAKING OVEN.
APPLICATION FILED JAN. 4, 1919.

1,394,220.

Patented Oct. 18, 1921.
3 SHEETS—SHEET 2.

INVENTOR
W. Roberts
BY
ATTYS

W. ROBERTS.
BAKING OVEN.
APPLICATION FILED JAN. 4, 1919.

1,394,220.

Patented Oct. 18, 1921.

INVENTOR
W. Roberts
BY
ATTYS

UNITED STATES PATENT OFFICE.

WILLIAM ROBERTS, OF WINNIPEG, MANITOBA, CANADA.

BAKING-OVEN.

1,394,220.  Specification of Letters Patent.  Patented Oct. 18, 1921.

Application filed January 4, 1919. Serial No. 269,606.

*To all whom it may concern:*

Be it known that I, WILLIAM ROBERTS, of the city of Winnipeg, in the Province of Manitoba, Canada, have invented certain new and useful Improvements in Baking-Ovens, of which the following is the specification.

The invention relates to improvements in baking ovens, particularly electric baking ovens and the principal object of the invention is to provide a low consumption evenly heated and easily controlled oven having considerable capacity and which requires practically no attention on the part of the attendant.

A further and important object is to arrange the heating elements of the oven in respect to the oven baking chamber such that one can have either bottom or top heat or both and can regulate the heats as wished, thereby insuring of the proper baking of the material in the oven.

A further object of the invention is to embody as part of the oven structure fire brick decks which are adapted to absorb and radiate heat and to place the heating elements in closed chambers between the brick decks, thereby protecting them from damage and at the same time having them operate in a closed heating chamber.

A further object is to arrange the heating elements and switches controlling the same so that one can have at will full, medium or low heat as occasion may demand.

With the above more important objects in view the invention consists essentially in the arrangement and construction of parts hereinafter more particularly described and later pointed out in the appended claim, reference being had to the accompanying drawings in which:—

Figure 3:
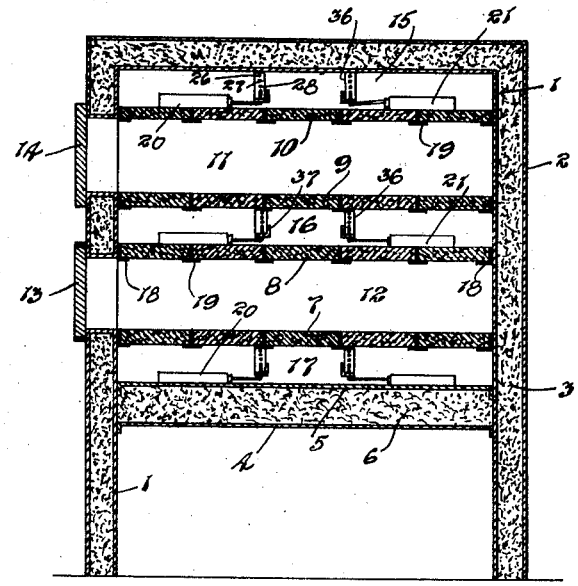

Fig. 3. represents a vertical longitudinal sectional view centrally through the oven.

Figure 4:
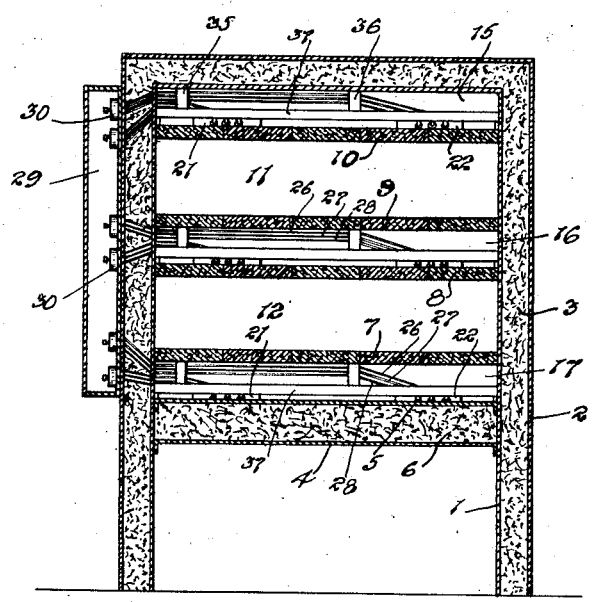

Fig. 4 represents a vertical cross sectional view through the oven, the section passing centrally through the switch box.

Figure 5:
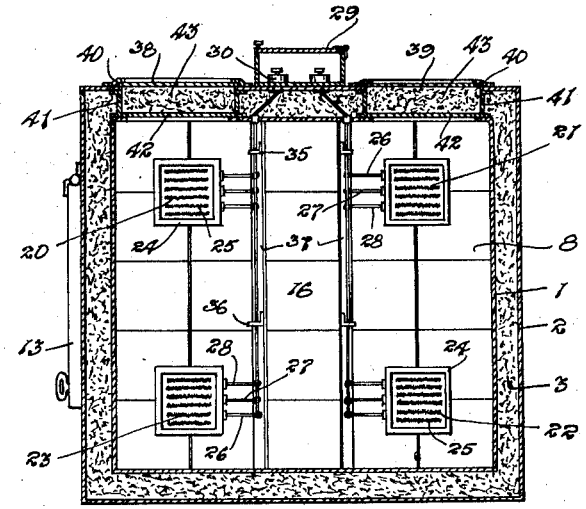

Fig. 5 represents a horizontal sectional view through the oven, the section being taken in the plane denoted by the line X—X' Fig. 3 and looking downwardly.

Figure 6:
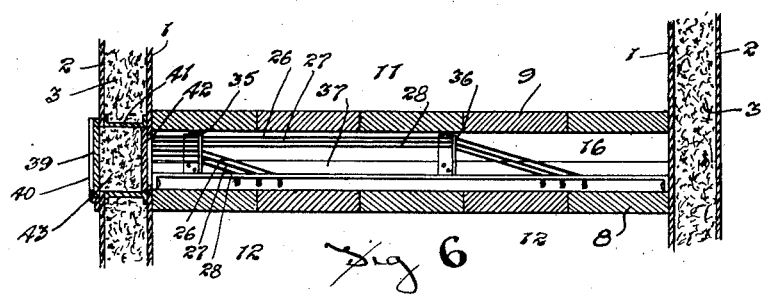

Fig. 6 represents an enlarged detailed vertical sectional view through a portion of the oven showing the method of supporting the wires within the heating chamber.

Figure 7:
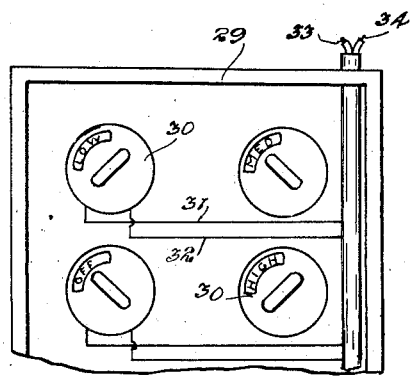

Fig. 7 represents an enlarged detailed front view of the upper part of the switch box showing the arrangement of the switches.

Figure 8:
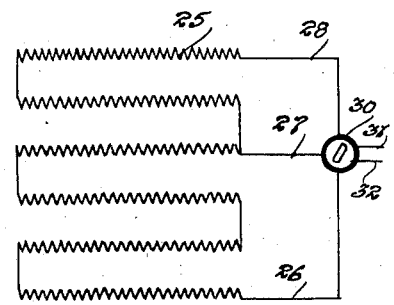

Fig. 8 represents diagrammatically the arrangement of each heating element and as associated with the controlling switch.

In the drawings like characters of reference indicate corresponding parts in the several figures.

The oven body comprises an inner casing 1 contained within and spaced from an outer casing 2, the two casings being suitably mounted on the floor and formed preferably from sheet metal and more or less in the nature of comparatively large open bottomed boxes. Between the casings I insert an insulating material 3 such as asbestos and in a location somewhat up from the floor I place two horizontally lying spaced cross partitions 4 and 5 which are also separated by an insulating material such as asbestos 6. The space within the inner casing and above the partition 5 is divided in the manner shortly described to provide a number of baking chambers and heating chambers above and below the baking chambers. 7, 8, 9 and 10 represent spaced decks formed from fire brick and passing completely across and the full length of the inner casing, to which they are hermetically sealed, the decks 7 and 10 being what might be termed upper decks and those 7 and 9 lower decks. The upper decks in each instance are made preferably thicker than the lower decks and the space between the decks forms the baking chambers 11 and 12 which are approached through the entrance doors 13 and 14 at the front of the oven.

Obviously in the present instance two baking chambers are provided and these are located between an upper heating chamber 15, an intermediate heating chamber 16 and a lower heating chamber 17.

In actual practice the fire bricks forming the decks are suspended by lengthwise extending angle bars 18 secured to the side walls of the inner casing and by lengthwise extending T-bars 19 secured to the end walls. Within the heating chambers I put the heating elements, there being four elements as indicated at 20, 21, 22 and 23 within each chamber. These elements rest or lie on the fire brick and are symmetrically spaced in from the sides of the chamber as best shown in Fig. 5 of the drawings.

The heating elements are all of the same construction, each comprising a frame 24 in which is mounted a heating coil 25 arranged as best shown in Fig. 8 where it will be observed that there are three feed wires 26, 27 and 28 connected with the coil, the feed wires leading directly from the heating element to the switch box 29 where they are connected to a controlling switch 30.

I desire to have a range of three heats in each element and to this end employ the ordinary form of switch which will indicate and show when turned a "low," "medium" and "high" position, the "low" position being when the switch is set to put the switch feed wires 31 and 32 into circuit with the wires 27 and 28, the "medium" when the wires 26 and 27 are in circuit with the feed wires 31 and 32 and the "high" when the wires 31 and 32 are in circuit with the wires 26 and 28.

I have not considered it necessary to give a detailed description of the type of switch utilized to form these connections as such are of common construction and form no part of this invention other than that they close the necessary circuits through the selected coils of the element and as indicated by the switch itself. (See Fig. 7.)

Figure 1:
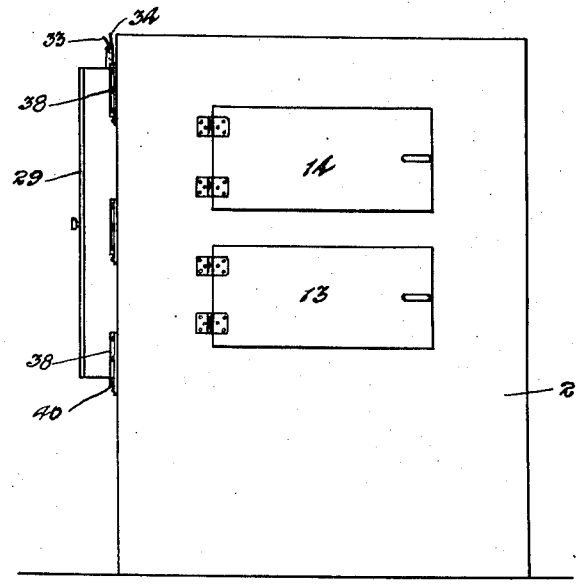
Figure 1 represents a front view of my oven.
Figure 2:
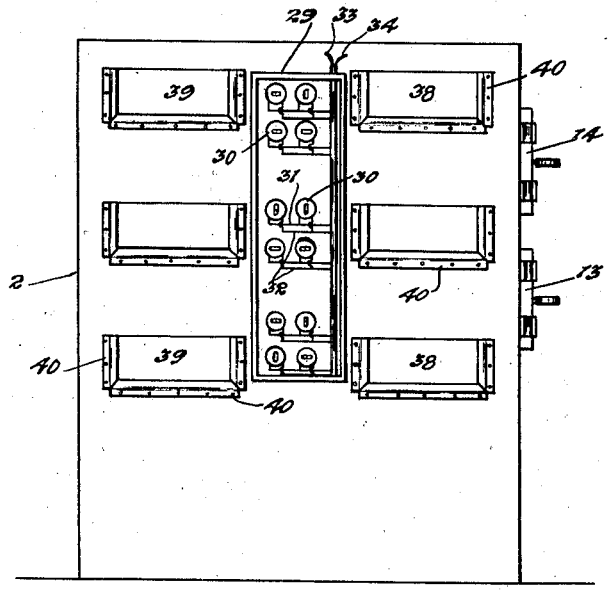
Fig. 2 represents a side view thereof showing the switch box with the cover removed.

As herein before stated three wires lead from each element to the switch and two feed wires 31 and 32 lead from each switch. The grouping of the wires in the switch box is best shown in Fig. 2 where it will be observed that the feed wires 31 and 32 connect with the mains 33 and 34 leading to the bottom of the switch box and connected with a suitable source of electromotive force.

Within the heating chambers the wires are carried by angle bar posts 35 and 36 extending upwardly from a lengthwise extending angle bar 37 which spaces the wires as they pass to the heating elements. In all cases the wires are insulated with an asbestos coating which will not burn.

At the side of the oven I provide front and rear entrance doors 38 and 39 which are slidably carried by Z-bars 40 attached to the outer casing. The doors open in each instance to a passageway 41 leading to the heating chambers and allowing of the examination of the heating elements as occasion may demand. Actually it is unnecessary to open these doors very often so that I put an inner closure plate 42 at the inner end of the entrance passage and fill the space between the closure plate and the door with an asbestos packing 43.

In utilizing this oven for baking purposes the material such as pastry, cakes or bread is put into the baking chambers after the oven has been brought up to a proper temperature and in this connection it will be understood that the cold material entering the oven has a natural tendency to quickly lower the temperature so that initially the temperature would be much higher than required for baking purposes. The material can be baked to a nicety as the variable heat control provided allows of any desired baking temperature being maintained and further owing to the variation of temperatures provided for I am able to control the heat at the top or bottom of the heating chamber, thereby being enabled to cook the material more or less at the top or bottom as required.

Obviously I have provided for a large range of heat and easy control of the heat in the baking chamber. A further feature in connection with this invention is that by utilizing fire brick I am able to store up heat and consequently keep a comparatively even temperature in the oven and further by actual demonstration I have found that after an oven of this type has been utilized all day for baking purposes and has been turned off it is, comparatively speaking, quite warm the following morning.

To make this clear I may say that if it is turned off at night when the baking temperature is approximately 450 degrees Fahrenheit, in the morning the oven will stand at a temperature of approximately 250 degrees Fahrenheit. Accordingly I can operate at very low cost as when the oven is again started in the morning one does not have to heat up a cold oven but has an established temperature of 250 degrees to start with. This is possible owing to the fact that the heating chamber is completely inclosed and insulated and embodies fire brick which retains the heat and slowly radiates it.

What I claim as my invention is:—

In a baking oven, the combination with an inclosing insulated casing, of spaced fire brick decks supported from the inner walls of the casing and dividing the interior of the casing into distinct baking chambers and air tight heating chambers and one such heating chamber located above and one below each baking chamber, individual inlet doors allowing of entrance through the casing to the several baking chambers and individually controlled electrical heating elements located within the heating chambers.

Signed at Winnipeg, this 11th day of October, 1918.

WILLIAM ROBERTS.

In the presence of—
GERALD S. ROXBURGH,
K. B. WAKEFIELD.